J. Walton,
Preventing Freezing of Gas Pipes.
No. 17,711. Patented June 30, 1857.
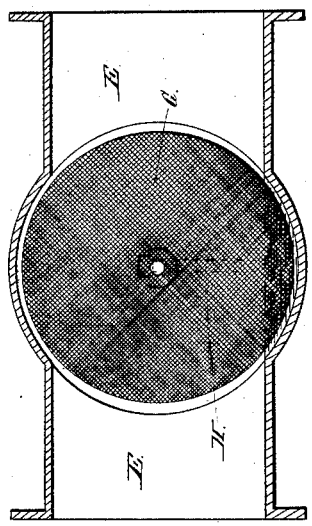
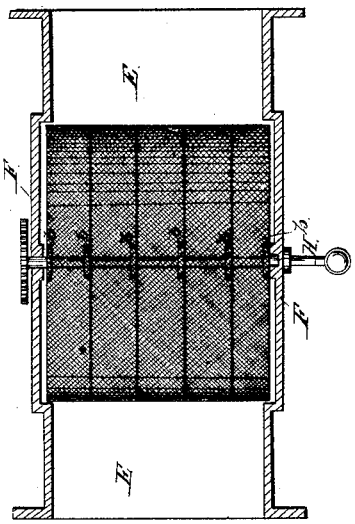
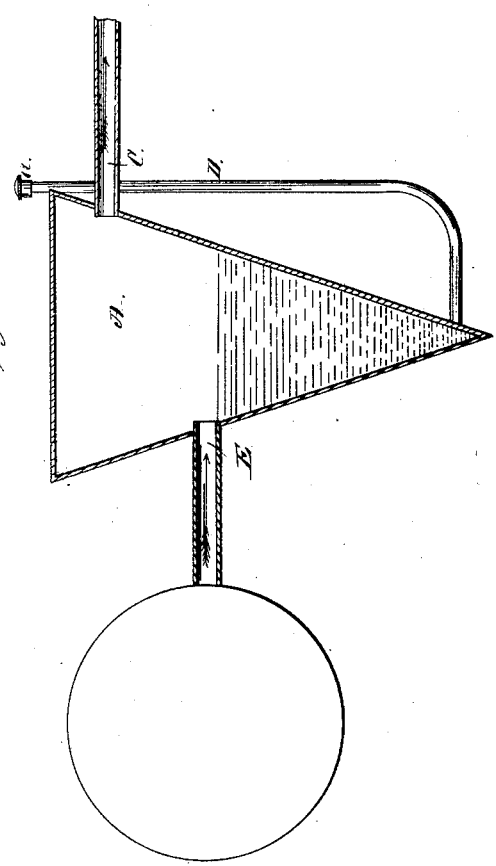

UNITED STATES PATENT OFFICE.

JOHN WALTON, OF LOUISVILLE, KENTUCKY.

CONDENSING LIQUIDS IN GAS-MAIN PIPES.

Specification of Letters Patent No. 17,711, dated June 30, 1857.

*To all whom it may concern:*

Be it known that I, JOHN WALTON, of the city of Louisville, in the county of Jefferson and State of Kentucky, have invented a new and useful Means of Preventing the Choking of Gas-Pipes by Frost; and I do hereby declare that the following is a full, clear, and exact description of the same, reference being had to the accompanying drawings, in which—

Figure 1 exhibits in vertical section the application of my invention to the service pipe of a dwelling-house or other building. Fig. 2 exhibits in vertical section the application of my invention in a main or street pipe. Fig. 3 is a horizontal section corresponding with Fig. 2.

It is well known to manufacturers of coal gas, that when the gas leaves the works it is charged to a greater or less degree with aqueous vapor, and when the pipes are cooler than the gas a portion of this vapor is condensed as it passes through them and in very cold weather this condensed vapor in passing through the service pipes is deposited on their inner surfaces in a thin coat of hoar frost, and if the cold is intense for any considerable time this coat continues to increase in thickness till the passage for the gas is so much diminished in size that the supply is very deficient, and in some cases the pipes become completely closed, when of course the supply of gas is cut off altogether. The object of my invention is to prevent this, and to this end the nature of my invention consists in the employment at any convenient place or places in the pipes of one or more vessels or receptacles containing alcohol or some other agent having a great affinity for water, over the surface of or otherwise in contact with which the gas is caused to pass before it arrives at or as it enters the service pipes, and is thus deprived of its aqueous vapor.

A, Fig. 1, is the vessel having the form of an inverted cone. B, is a short pipe connecting the said vessel with the street pipe; and C, is the service pipe leading from the upper part of the said vessel to a dwelling house or other place. D, is a pipe through which alcohol or other liquid having a great affinity for water is supplied to the vessel A; said pipe being provided with a cap (*a*), to close it. The vessel A is filled with the alcohol or other liquid to about or near the level of the bottom of the pipe B, so that the gas in passing through the vessel to the service pipe will pass close to the surface of the liquid. When the liquid is so much charged with water as to have its hygrometric strength too much diminished, it may be drawn off by a pump through the pipe D, or be allowed to run out from the vessel by turning the pipe D downward, as may be most convenient.

The vessel A, may be of other form than that above mentioned and represented in the drawing; but I have chosen that form on account of its presenting a large surface of liquid in proportion to the quantity contained in it.

E, Figs. 2 and 3, is a main pipe having an enlarged part F in the form of a horizontal cylinder to contain a wheel G, whose periphery is made of wire gauze or other reticulated or porous material, and which contains several diaphragms (*b*) (*b*) of similar material. The lower portion of the cylinder F, is filled with alcohol or other hygrometric liquid up to the level of the bottom of the pipe, through a pipe H. The wheel G, receives a rotary motion by which its porous periphery and diaphragms are caused to take up the liquid and present it spread over a large surface. The gas in passing through the cylinder F, comes in contact with the moistened surface of the wheel G, and is thus caused to be deprived of its aqueous vapor before arriving at the service pipes. The pipe H, serves the same purpose as the pipe D, in Fig. 1. The cylinder F, and wheel G, may be at or conveniently distant from the gas works. The wheel may be caused to rotate by being geared to a wheel like that commonly used in the "wet gas meter," which would be caused to rotate by the gas passing it, or it may be caused to rotate by a spring or weight and cord or by various means.

I have described the two modes of carrying out my invention which I at present consider the most practical; but I wish it to be understood that I do not confine myself to those particular modes, and that I do not confine myself to the use of any particular hygrometric agent to deprive the gas of the aqueous vapor, though I prefer to use alcohol as it not only absorbs the water from the gas but if a portion of it is taken up in suspension by the gas the brilliancy of its flame will generally be increased.

What I claim as my invention, and desire to secure by Letters-Patent, is:

The employment, substantially as described, at any convenient place or places in the gas pipes, of one or more vessels or receptacles containing alcohol or other hygrometric agent, for the purpose herein specified.

JOHN WALTON.

Witnesses:
   I. M. HEWETT,
   JOHN PRICE.